Figure 1:
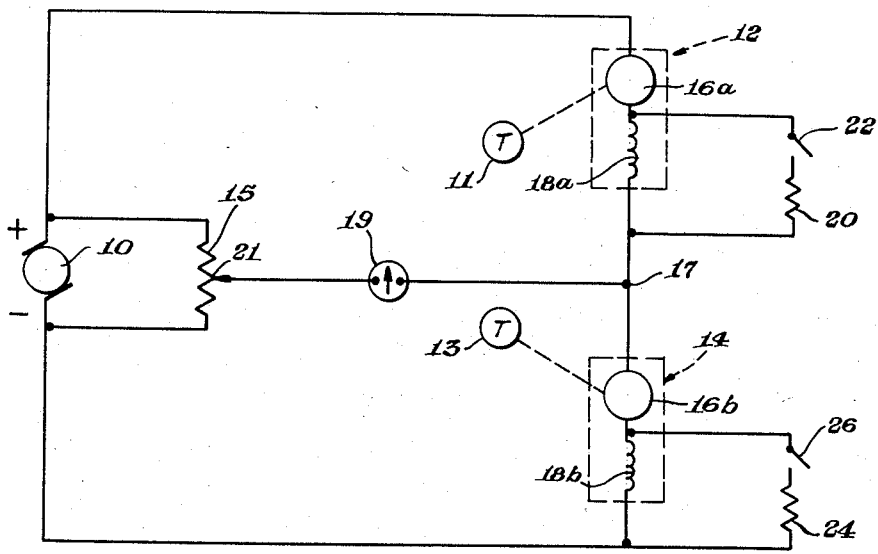

March 29, 1960

L. C. CRONBERGER 2,930,957

MOTOR CONTROL METHOD AND APPARATUS

Filed Nov. 7, 1956

INVENTOR.
Luther C. Cronberger
BY
Griswold & Burdick
ATTORNEYS

United States Patent Office 2,930,957
Patented Mar. 29, 1960

2,930,957

MOTOR CONTROL METHOD AND APPARATUS

Luther C. Cronberger, Tulsa, Okla., assignor to The Dow Chemical Company, Midland, Mich., a corporation of Delaware Application November 7, 1956, Serial No. 620,835

1 Claim. (Cl. 318—52)

This invention relates to a method of and apparatus for stabilizing the operation of two or more mechanical devices having nonsynchronized loads and which are driven by individual series wound electrical motors connected together in series across a power source.

One example of mechanical devices which are driven by pairs of series connected electrical motors connected in series across a power source are diesel electric locomotives. As long as there is no wheel-to-rail slippage of any of the drive wheels of the locomotive, no single motor supplying power to the drive wheels has an opportunity to overspeed. Thus, normally the mechanical connection or linkage between the motors through the rails is a means of keeping the motors running at the same rate. If a locomotive wheel does slip, the known solution is to decrease the power available to all the driving motors to the point where the slippage (and motor overspeeding) stops.

In other applications in which series wound electrical motors connected in series across a power source are coupled to independent mechanical loads, however, often there is no mechanical linkage between the loads to control speed. Thus, when one of the series connected motors gains speed, due to a lightening of the load on the motor, for example, the motor then tends to continue to increase its speed. Such an increase in speed may result in damage either to the electric motor or to the load to which it is coupled. As used herein the term "motor" (electric) refers to a series wound motor unless another type of electric motor is specified.

The driving of pumps used in oil and gas field servicing operations is one example of service in which series wound electric motors which are connected in series are often used. Since the frictional force of each pump driven by the motors may differ by ten percent, for example, even for "identical" pumps, it can be appreciated that the electric driving motor driving the pump presenting the lighter mechanical load would increase in speed. An increase in speed of one of the series connected electric motors would result in more back E.M.F. being generated in that motor and would thus tend to further cause the other motor or motors in the series to decrease in speed. Carried to the ultimate, one motor would finally stall and the other motor (the one tending to increase in speed) would carry the entire pumping load. It can thus be seen that unless means are provided for stabilizing the speed of series connected electrical motors which are coupled to pumps representing changing or uneven loads, serious inconvenience or damage may result.

Accordingly, a principal object of this invention is to provide an improved method of and apparatus for stabilizing the operating speed of series connected series wound electrical motors which are coupled to varying or unequal loads.

In accordance with this invention means are provided for determining changes from the "normal" voltage drop across each motor and utilizing the change in voltage to connect a shunt across the speeding motor (the motor having an abnormally high back E.M.F.) to reduce its torque until the potential drop across the motor is "normal," and then disconnecting the shunt.

Figure 2:
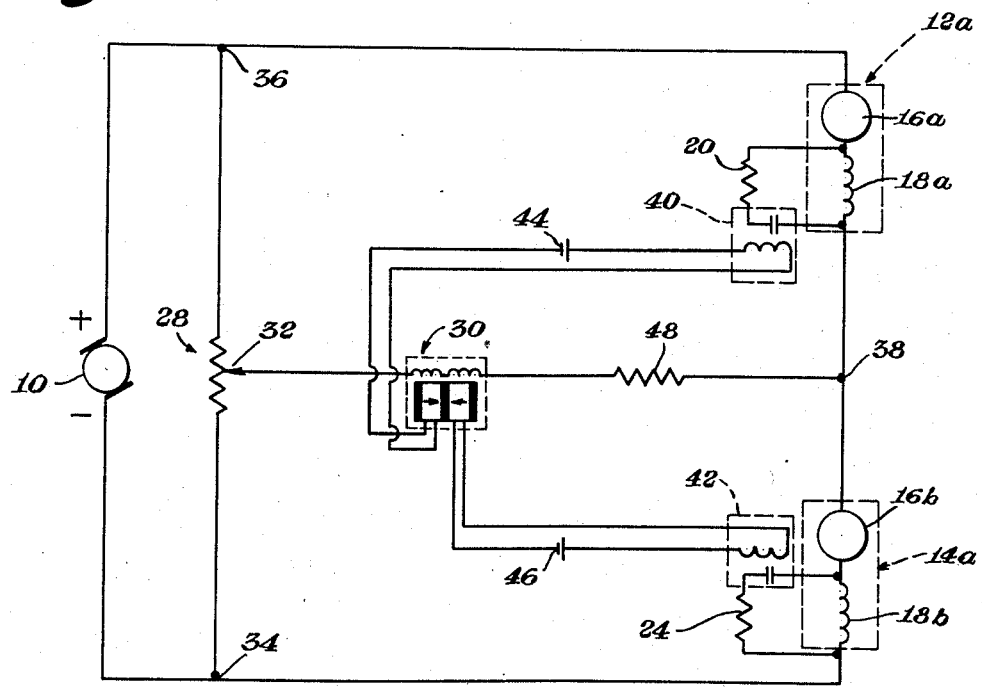

The invention, as well as additional objects and advantages thereof, will best be understood when the following detailed description is read in connection with the accompanying drawings, in which:

Fig. 1 is a schematic circuit diagram showing apparatus suitable for manually controlling the voltage distribution across series connected electric motors which may drive unequal loads, and Fig. 2 is a schematic circuit diagram showing apparatus for automatically stabilizing the voltage distribution across series connected electric motors which may drive unequal mechanical loads.

Referring to Fig. 1, there is shown a direct current generator 10 across which is coupled two series wound electric motors, indicated generally by the numerals 12, 14 respectively, the motors being connected in series. Each motor has an armature 16a, 16b respectively and a field 18a, 18b, respectively, which is connected in series with the armature of the motor. A field shunt 20 and switch 22 connected in series, are coupled across the series field 18a of motor 12. A second field shunt 24 and switch 26, connected in series, are coupled across the field 18b of the motor 14.

In operation, when one motor increases its speed due to inequalities in the torque load on the two motors 12 or 14, switch 22 or 26, depending on which motor is increasing in speed, is momentarily closed, connecting the field shunt (20 or 24) across the motor (12 or 14). The field shunt is connected across the field of the motor which is picking up speed in order to bypass part of the motor current around the field winding and reduce the torque of that motor and lower the speed of rotation of its armature. Since the torque load which each motor drives may vary, the speed of each motor must be observed (by a tachometer 11, 13, for example) in order to determine the motor whose field should be shunted. An electrical means of determining which motor 12, 14 is speeding may be provided by inserting a tapped resistance 15 across the generator 10, the tap being at a potential which corresponds to the potential at the juncion 17 when the motors 12, 14 run at normal speeds. Thus, an ammeter 19 connected between the top 21 and junction 17 would, by the direction of its needle movement, indicate which motor 12, 14 was speeding (due to the change in potential at 17).

Fig. 2 is similar to Fig. 1, but incorporates additional circuit elements which detect changes in potential drop across the motors 12a, 14a (which are caused by changes in speed of the motors) and automatically insert a field shunt across the field of the motor which is gaining speed. In Fig. 2 a load potentiometer, indicated generally by the numeral 28, is shunted across the output of the generator 10. A differential voltage relay, indicated generally by the numeral 30, is connected between the movable arm 32 of the potentiometer 28 and a junction point 38 between the two motors 12, 14. If the motors 12, 14 are of equal power rating, the movable contact arm 32 of the potentiometer 28 is usually connected at the electrical midpoint of the potentiometer. If one motor 12 or 14 is larger than the other, then the movable arm of the potentiometer is positioned along the potentiometer resistance element in accordance with the power rating of the two motors. (The motor having the greatest power rating will normally have the largest voltage drop across itself of any motor in the series.) Thus, if the motor 14 is the motor having the greatest power rating, the resistance between the contact arm 32 of the potentiometer 28 and the junction point 34 would be greater than the resistance between the arm 32 and the junction 36 by a factor depending on the ratio of the power ratings of the motors 12a and 14a.

The differential voltage relay 30 may be either the single coil or double coil variety having two sets of contacts. When no current flows through the coil or coils, or when the flow of current through the coil or coils is balanced in each direction of flow, both sets of contacts remain open. When more current flows in one direction through the coil or coils than flows in the other direction, one set of contacts closes and remains closed until the current flow through the coil or coils ceases or is equal in each direction of flow. Such differential voltage relays may be obtained, for example, from the Aircraft Controls Division, Barber Coleman Co., Rockford, Illinois, U.S.A. (A double coil relay, when used in Fig. 2, for example, has its coils connected in series between the junction 38 and the contact arm 32.)

As illustrated in Fig. 2, the differential relay 30 is not directly used to switch the shunts 20, 24 across the motor fields. A heavy duty relay, 40 and 42, energized by the battery 44 or 46 when one of the contacts closes on the differential voltage relay 30, is used to couple (or uncouple) the shunt 20 or 24 across the field 18a or 18b. A heavy duty relay is needed because of the large current flow through the shunts.

In operation, as long as both motors 12, 14 are running at their normal speed, no potential difference appears across the winding or windings of the differential relay 30 because the potential at the movable arm 32 (previously set) is the same as the potential at the junction 38. Any change in the division of the supply voltage between the motors 12, 14 will change the potential of the junction 38 and cause a potential drop across the relay 30. The direction of current flow through the relay 30 will depend on whether the junction 38 is at a higher or lower potential than the potential of the contact arm 32. The potential drop across each motor is a function of its speed. If motor 12 gains in speed, the junction 38 is lowered in potential, thereby causing current flow in a direction which closes those relay contacts (not shown) which energize the relay 40, closing its contacts and connecting the shunt 20 across the field winding 18a. Connecting the shunt 20 across the field winding 18a lowers the torque by reducing the current through winding 18a and consequently lowers the speed of the motor 12. When the potential at junction 38 again equals the potential at the contact arm 32 as the motor speeds equalize, the relay contacts of relay 30 open, de-energizing relay 40, decoupling the shunt 20 from the field winding 18a.

If the motor 14 then begins to speed, for example, the potential at junction 38 raises, causing current flow through the windings of the relay 30 in the opposite direction. The relay 42 is then energized, connecting the shunt 24 across the field winding 18b until the potential at the junction 38 reaches the potential of the contact arm 32.

Inasmuch as the sensitivity of the relay 30 might cause the insertion of the shunts 20 or 24 on very small changes of speed of the motors 12, 14, a resistance 48 of suitable value may be inserted in series with the windings of the relay 30 to adjust the degree of change of potential at junction 38 which will be required to close the contacts of the relay 30.

From the above description of the operation of the apparatus it is apparent that this invention provides a novel uncomplicated method of and apparatus for controlling the speed of series wound electric motors which are connected in series across a source of potential.

While this invention has been described in connection with only two electrical motors connected in series, it is anticipated that adaptations of the method of this invention will be utilized to control the speed of three or more electrical motors which are connected in series.

I claim:

Apparatus for stabilizing the speed of two electrical motors each having an armature and a field winding connected in series and said motors being connected in series, comprising a resistance element having a tap, said resistance element being connected in parallel across said motors, a differential voltage relay having pairs of contacts, said relay being electrically connected to the tap of said resistance element and electrically connected between the two motors, a pair of shunts and a pair of switches, one of said shunts and one of said switches being connected in series across the field winding of each motor, and magnetic means coupled to the contacts of said differential relay for selectively opening and closing said switches in response to changes in magnitude and direction of current flow through said differential relay.

References Cited in the file of this patent

UNITED STATES PATENTS

| | | |
|---|---|---|
| 636,023 | Cravath | Oct. 31, 1899 |
| 715,019 | Case | Dec. 2, 1902 |
| 1,278,192 | Mullaney et al. | Sept. 10, 1918 |
| 1,717,191 | Cremer | June 11, 1929 |
| 2,361,200 | Hibbard | Oct. 24, 1944 |